United States Patent
Sankaran et al.

(10) Patent No.: US 9,743,137 B2
(45) Date of Patent: Aug. 22, 2017

(54) RUN-TIME SDK INTEGRATION FOR CONNECTED VIDEO PLAYERS

(71) Applicant: YuMe, Inc., Redwood City, CA (US)

(72) Inventors: Ayyappan Sankaran, San Jose, CA (US); Rajesh Krishnan, Chennai (IN)

(73) Assignee: YuMe, Inc., Redwood City, CA (US)

( * ) Notice: Subject to any disclaimer, the term of this patent is extended or adjusted under 35 U.S.C. 154(b) by 0 days.

(21) Appl. No.: 14/677,963

(22) Filed: Apr. 2, 2015

(65) Prior Publication Data

US 2016/0295277 A1    Oct. 6, 2016

(51) Int. Cl.

| | |
|---|---|
| *H04N 21/41* | (2011.01) |
| *H04N 21/443* | (2011.01) |
| *H04N 21/81* | (2011.01) |
| *H04N 21/458* | (2011.01) |
| *H04N 21/437* | (2011.01) |
| *H04N 21/435* | (2011.01) |

(52) U.S. Cl.
CPC ....... *H04N 21/4431* (2013.01); *H04N 21/435* (2013.01); *H04N 21/437* (2013.01); *H04N 21/4586* (2013.01); *H04N 21/812* (2013.01)

(58) Field of Classification Search
CPC ............................ H04N 21/405; H04N 21/458
See application file for complete search history.

(56) References Cited

U.S. PATENT DOCUMENTS

| 2013/0227607 | A1* | 8/2013 | Saltonstall ........... H04N 21/458 725/35 |
| 2015/0128157 | A1* | 5/2015 | Hardie ................. H04N 21/812 725/5 |

* cited by examiner

*Primary Examiner* — Hunter B Lonsberry
(74) *Attorney, Agent, or Firm* — Tips Group (57) ABSTRACT

A video player device obtains a run-time SDK from a CDN server when it is time to display a video Ad and makes an Ad request to an Ad server via the network interface using the run-time SDK. A video player displays an Ad on the screen that is received as an Ad response. In a first example embodiment, the device includes an SDK Native Library which, when initialized, downloads an HTML SDK from the CDN server. In a second example embodiment, the device makes a VAST request to the CDN server, where a VAST response includes a VPAID wrapper containing a run-time SDK as a VPAID creative. The VAST response is parsed and the VPAID creative is then loaded and invoked by VPAID APIs of the run-time SDK.

17 Claims, 9 Drawing Sheets

RUN-TIME SDK INTEGRATION FOR CONNECTED VIDEO PLAYERS

BACKGROUND

Electronic commerce, often known as "e-commerce," includes the buying and selling of products or services over electronic systems such as the internet. The amount of trade conducted electronically has grown immensely with the widespread adoption of internet technology. One particularly explosive area of growth in e-commerce is in the field of advertising and, in particular, video advertising on the Internet.

Typically, there are three entities involved in online video advertising. Content and service providers, such as websites, software applications ("apps"), and the like are often referred to as "publishers." Persons using network-connected ("connected") video player devices, such as computers and smart mobile devices, to access publisher content and/or services are referred to variously as "users", "clients", "audience", "visitors", "eyeballs" and the like. Those who wish to place ads with publishers to be viewed by users are referred to as "advertisers." The amount of resources (e.g. physical space, time, etc.) available for video advertising is sometimes referred to as "inventory."

There is competition by publishers for advertisers and entities that represent advertisers. That is, since many advertisers are represented by ad agencies, ad networks, and/or other entities managing the distribution of advertising (collectively "ad networks" or "advertisers") this competition for advertisers extends to such entities. Since most publishers offer some form of fee splitting arrangement with ad networks, some of this competition may be reflected by the profit margins they offer to ad networks. It is therefore important for ad networks to provide accurate user and device interaction data with respect to the advertisements that they place and to optimize the operation of video player devices. While some of this data can be derived by a user's interaction with one or more ad servers, there has been increasing amount of attention to the development of Software Development Kits ("SDKs"), which reside on the video player devices and integrate with the video player software to monitor and enhance the performance of the video player devices with respect to the display of video ads. For example, SDKs can be used to affect the timing, nature, delivery and display of video ads.

In general, an SDK is typically a set of tools and protocols which allows for the enhancement of software and/or hardware platforms. In the context of video advertising on, for example, personal computers, laptop computers, tablets, smartphones, Smart-TVs and the like, an SDK is often used to configure a software video player to support a particular advertising platform. For example, an advertiser (such as an advertising network) can provide a publisher (such as a company's website or an application or "App" developer) with an SDK that is specific to that advertiser. In the case of a website publisher, the SDK can be integrated into its video player for delivery to a user's device over a network, such as the internet or a telephone data network. In the case of, for example, a smartphone application ("App") developer, an advertiser can provide the developer with its SDK for integration with the developer's App.

In online advertising where browsers and other web-based protocols are used to display ads, tracking ad interactions is made possible using Hypertext Markup Language (HTML) to send data across the many networks and servers that may be involved. However, some video player devices, including some mobile devices such as smartphones, do not always employ traditional browsers and may not use HTML. That is, video players are built on a variety of different technologies, each using their own instance of the technology. If ad servers want to serve ads to a variety of video players, they have to develop ad tags designed to display ads based on the technology of each video player they want to serve. Complicating matters is that multiple servers may be required as part of the process to serve ads, requiring each to provide specialized ad display information.

In order for publishers to serve ads across multiple video player platforms, it is desirable for the industry to come up with a set of common standards. This was realized early on in the video ad space, and the first versions of these standards were developed back in 2008, when the Interactive Advertising Bureau (IAB) introduced the first version of the Video Ad Serving Template (VAST). In 2009, the IAB introduced the Video Player-Ad Interface Definition (VPAID) and, more recently, the Digital Video Multiple Ad Playlist (VMAP) which, along with VAST, comprise the IAB Video Suite, which currently includes VAST 3.0, published Jul. 19, 2012, VPAID 2.0, released Apr. 10, 2012, and VMAP 1.0.1, released in July, 2014. The VAST 3.0, VPAID 2.0 and VMAP 1.0.1 specifications are incorporated herein by reference in their entireties.

The IAB Video Suite's specifications are designed to work together, as part of a thorough in-stream video advertising offering: The VAST specification provides a universal protocol for serving in-stream video ads, permitting ad servers to use a single ad response format across multiple compliant publishers/video players. The VPAID specification provides a communication protocol between ad units and video players that enables rich ad experiences and detailed event reporting back to advertisers. The VMAP specification provides a protocol that allows content owners to describe where ad breaks should be placed in their content when they do not control the video player or the content distribution outlet.

Essentially, VAST is a video ad-serving template that provides a uniform way for advertising data to be transferred from ad servers to video players independent of any technology. Using XML, VAST does for video ad serving what HTML does for browser-based ad serving. That is, just as HTML enables web browsers to display websites from any web server, VAST enables video players to display ads from any video ad server.

In general, the ad-serving process supported by VAST involves the video player requesting a video ad, displaying the VAST response and sending tracking information for ad impressions and other events back to the server. This can be done directly between the video player and one ad server (usually the publisher's) or between the video player and multiple ad servers. The ads may be in-stream video ads may that play before, after or in the middle of the publisher's content video ("linear ads"). Linear ads are typically served as video, but may also include static images, that play for a set duration at linear points along the timeline of the content video. They may play before the content video starts (pre-roll), at a break during the content video (mid-roll), or after the content video (post-roll). The ads may also be image or "overlay" ads overlaying content video while the contents is being played. ("nonlinear ads"). Nonlinear ads usually cover the top or bottom fifth of the content video and are typically text or static images that display for about 10-20 seconds.

Companion ads are served with linear or nonlinear ads, but are displayed outside the video player. They can serve as a "leave-behind" on the page after the video ad has ended and enable a more engaging experience for the user. A Companion Ad is commonly displayed as a standard banner or rich media ad, but can also be a skin that wraps the video ad experience. One or more Companion ads may be served with the originating video portion of the ad, or the Master Ad.

While VAST provides a common ad response format for video players to enable video ads to be served across all compliant video players, it does not provide stand-alone support for rich interactivity. VAST alone only supports relatively simple in-stream video ad formats that are not executable. These simple ad formats do not provide an interactive user experience, and do not allow the advertiser to collect rich interaction details. The introduction of VPAID standards allows compliant video players to display rich interactive media ads, also known as an "executable ad units." Furthermore, VPAID offers Application Programming Interfaces ("APIs") to interface video players with the executable ad units. In consequence, VPAID opens a line of communication between an executable ad unit and a video player, making it possible for the two to interact.

A Content Delivery Network (a/k/a "Content Distribution Network" and/or "CDN") is typically a large, distributed system of servers deployed in multiple data centers across the internet. The goal of a CDN is to serve content to end-users with high availability and high performance. CDNs serve a large fraction of the internet content today, including web objects (text, graphics and scripts), downloadable objects (media files, software, documents), applications (e-commerce, portals), live streaming media, on-demand streaming media, and social networks.

Content providers, such as media companies and e-commerce vendors, can pay CDN operators to deliver their content to their audience of end-users. In turn, a CDN pays ISPs, carriers, and network operators for hosting its servers in their data centers. Besides better performance and availability, CDNs also offload the traffic served directly from the content provider's origin infrastructure, resulting in possible cost savings. In addition, CDNs provide the content provider a degree of protection from Denial of Service ("DOS") attacks by using their large distributed server infrastructure to absorb the attack traffic. While most early CDNs served content using dedicated servers owned and operated by the CDN, there is a recent trend use a hybrid model that uses peer-to-peer (P2P) technology. In the hybrid model, content is served using both dedicated servers and other peer-user-owned computers as applicable.

Most CDNs are operated as an application service provider ("ASP") on the internet (also known as on-demand software or software as a service). An increasing number of internet network owners have built their own CDNs to improve on-net content delivery, reduce demand on their own telecommunications infrastructure, and to generate revenues from content customers. This might include offering access to media streaming to internet service subscribers.

While SDKs have been proven to be valuable, there is room for improvement. One problem is the difficulty of integrating an advertiser's SDK with a publisher's video player. For example, a website publisher must integrate SDKs, sometimes from a number of different advertisers, into its video players before delivering them to the users. This can be a time consuming process, and must be repeated as new versions of the advertisers' SDKs are released. This can be even more daunting for App developers, who would have to update their apps to keep up with advertiser SDK updates. As a result, many publishers limit the number of SDKs that they will support, and may continue to use older, less effective SDKs rather than go through frequent updates of their video players.

These and other limitations of the prior art will become apparent to those of skill in the art upon a reading of the following descriptions and a study of the several figures of the drawing.

SUMMARY

In an embodiment, set forth by way of example and not limitation, a video player device with run-time SDK integration includes a digital processor, a screen coupled to the digital processor, a network interface coupled to the digital processor, and non-transitory digital memory coupled to the digital processor. The non-transitory digital memory includes code segments that are executable on the digital processor for: (a) obtaining a run-time Software Development Kit (SDK) from a Content Delivery Network (CDN) server via the network interface when it is time to display a video advertisement (ad) on the screen; and (b) making an ad request to an ad server via the network interface using the run-time SDK. In certain, non-limiting examples, the non-transitory digital memory further includes code segments comprising a video player operative to display an ad on the screen that is received as an ad response from the ad server.

A mobile platform video player device with run-time SDK integration, set forth by way of example and not limitation further includes code segments that are executable on the digital processor to implement a mobile platform application (App). In an embodiment, the non-transitory digital memory further includes code segments comprising a mobile SDK Native Library, wherein an initialization of the Native Library initiates a download of a Hypertext Markup Language (HTML) SDK from the CDN server, and wherein the run-time SDK is at least HTML Version 5 (HTML5).

A browser or web-based video player device with run-time SDK integration, set forth by way of example and not limitation, makes a Video Ad Serving Template (VAST) request to the CDN server in order to download a run-time SDK disguised as a VPAID creative. More particularly, in this non-limiting example, a VAST response including a Video Player-Ad Interface Definition (VPAID) wrapper containing a run-time SDK as a VPAID creative is downloaded from the CDN server which then parses the VAST response, loads the VPAID creative, and invokes VPAID APIs of the run-time SDK.

In an embodiment, set forth by way of example and not limitation, a method for improving video ad display on a video player device includes: (a) providing a video player device including a digital processor, a screen coupled to the digital processor, a network interface coupled to the digital processor, and non-transitory digital memory coupled to the digital processor including code segments implementing a video player; (b) obtaining a run-time Software Development Kit (SDK) from a Content Delivery Network (CDN) server via the network interface when it is time to display a video advertisement (ad) on the screen; (c) making an ad request to an ad server via the network interface using the run-time SDK; and (d) displaying the ad using the video player.

In certain embodiments, set forth by way of example and not limitation, the run-time SDK is a Hypertext Markup Language (HTML) SDK of at least Version 5 (HTML5), and the video player further comprises a mobile platform application (App) and a mobile SDK Native Library. In certain other embodiments, also set forth by way of example and not limitation, the video player makes a Video Ad Serving Template (VAST) request to the CDN server and receives a VAST response including a Video Player-Ad Interface Definition (VPAID) wrapper containing a run-time SDK as a VPAID creative.

In an embodiment, set forth by way of example and not limitation, a Content Delivery Network (CDN) server includes, a digital processor, a network interface coupled to the digital processor, and non-transitory digital memory coupled to the digital processor including code segments that are executable on the digital processor for: (a) receiving a request via the network interface from a video player device for a run-time Software Development Kit (SDK); and (b) sending the run-time SDK to the video player via the network interface, whereby the run-time SDK is configured for automatic integration with the video player device.

In certain non-limiting example embodiments, the video player device is a mobile platform, and the run-time SDK is a Hypertext Markup Language (HTML) SDK of at least Version 5 (HTML5). In certain other non-limiting example embodiments, the request for a run-time SDK comprises a Video Ad Serving Template (VAST) request, wherein the run-time SDK comprises a VAST response including a VPAID wrapper containing a run-time SDK as a VPAID creative.

In certain example embodiments, the latest version of a run-time SDK is downloaded from a CDN server and integrated with a video player to improve the performance of the video player device. In other example embodiments, a run-time SDK is disguised as a VPAID creative, and is automatically integrated into a video player device that is VAST/VPAID compliant.

An advantage of various embodiments is that the publisher's task of integrating an SDK into a video player or App is greatly reduced and/or eliminated. Also, a publisher no longer needs to worry about upgrading its video player software due to the release of new versions of advertisers' SDKs in that the latest versions of the SDKs are downloaded from the CDN server at run-time.

These and other embodiments, advantages and features will become apparent to those of skill in the art upon a reading of the following descriptions and a study of the several figures of the drawing.

BRIEF DESCRIPTION OF THE DRAWINGS

Several example embodiments will now be described with reference to the drawings, wherein like components are provided with like reference numerals. The example embodiments are intended to illustrate, not limit, concepts disclosed herein. The drawings include the following figures.

DETAILED DESCRIPTIONS

Figure 1:
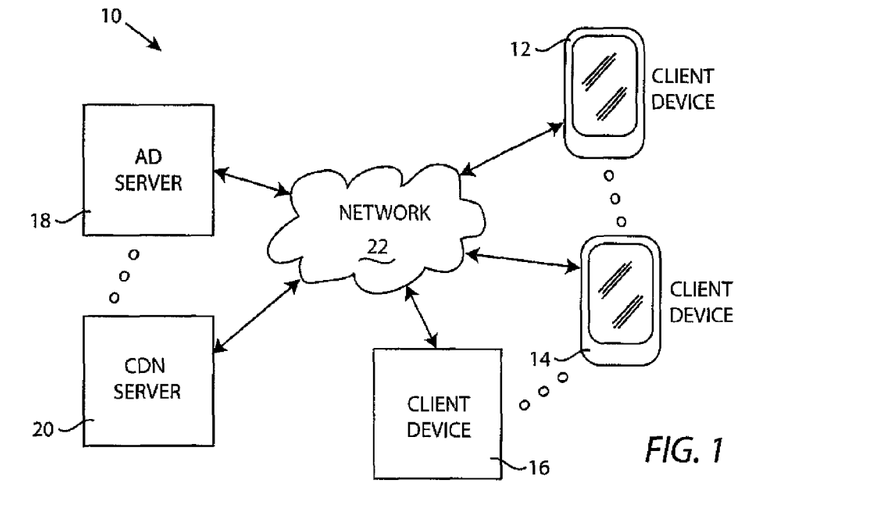
FIG. 1 is a block diagram of an example system which can be used in some implementations of one or more features described herein.

FIG. 1 is a block diagram of an example system 10 which can be used in some implementations of one or more features described herein. In this example, the system 10 includes one or more user client devices such as a smartphone 12, a tablet computer 14 and a computer 16, a number of servers including an ad server 18 and a CDN server 20, all of which are connected to a network 22. As used herein, the words "client" and "user" may be used synonymously.

User client devices can be any devices that are operated by users and connected to network 22 by a communication link, such as a wireless or wired link. A client device can perform a variety of functions, including performing communications with other devices and running applications on the device that receive input from the user and provides output to the user. In some examples, the user input can be in various forms including contacting a touchscreen on the device, manipulating an input pointing device (e.g., mouse, trackball, touchpad, joystick, etc.), pressing physical keys or physical buttons (keyboard, buttons, etc.), providing voice or sound input to a microphone, causing motion of the device, etc. Any of a variety of devices can be used as user devices in addition to the non-limiting examples of smartphone 12, tablet computer 14 and computer 16 including, but not limited to, personal digital assistants (PDAs), game devices, televisions, telephones, media players, home appliances and devices, etc.

Ad server 18 can provide streaming video advertisements ("ads") to client devices over network 22. An ad server 18 can be provided by an advertiser or an ad network, and a video content server 20 can be provided by a number of sources including YouTube® of Mountain View, Calif. An ad server 18 can, for example, provide "pre-roll" in-stream ad which precedes video from video content server 20. Such pre-roll in-stream ad often takes the form of a 15-30 second video advertisement for a product or service.

CDN server 20 is representative of one or more internet-connected servers located in one or more geographical locations. In an embodiment, CDN server(s) 20 provide up-to-date, run-time SDKs for video players. By "run-time" it is meant herein that the SDK delivered by the CDN server 20 is the latest and/or most suitable SDK available for a running video player which makes a request for a run-time SDK. This ensures that the operation of the video player, and therefore the user experience, will be improved by the use of the latest version of the advertiser's SDK, and also frees the publisher from the burden of instantiating or upgrading the advertiser's SDK in its video player software.

One or more networks 22 are used to provide communication channels for the various devices of system 10. Network 22 can be any type of communication network, such as the internet, local area networks (LANs), cell phone networks, or other networks. Some implementations can provide features described herein on devices that are intermittently connected to network 22. A number of network communication protocols are suitable for the communication between the client devices and the servers of the system 10.

Figure 2:
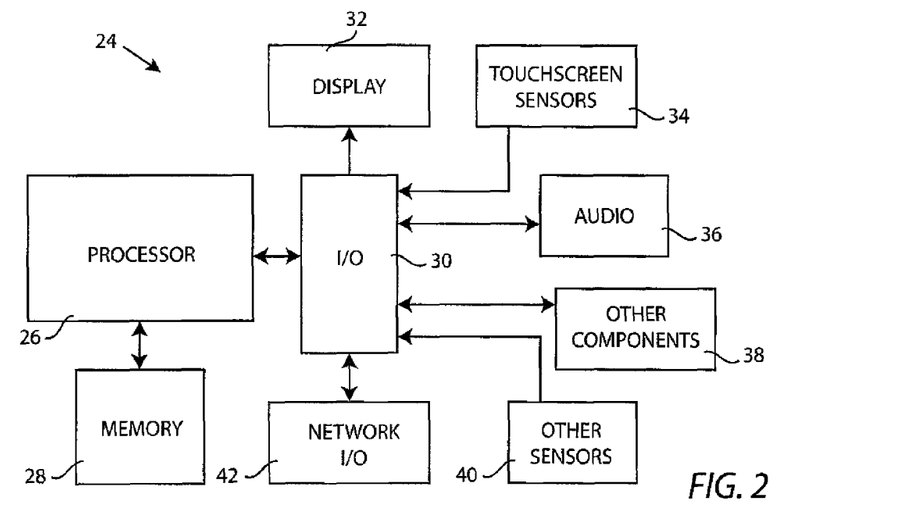
FIG. 2 is a block diagram illustrating an example mobile client device suitable for use with features described herein.

FIG. 2 is a block diagram illustrating an example client device 24 suitable for use with features described herein. For example, client device 24 can be used to illustrate mobile client devices such as smartphone 12 and tablet computer 14. A digital processor 26 can be included in client device 24 to control operation of the device. The digital processor 26 can be one or more of any type of digital processors or processing circuitry, such as microprocessors, ASICs, FPGAs, logic gates, etc. The digital processor 26 can access memory 28 which can store a variety of program instructions and data for use and output by digital processor 26, including applications, operating system data, data received from other devices over a network, etc. In some implementations, memory 28 can be embedded in digital processor 26, and/or can be provided separately in the client device 24. Any of a variety of different types of memory can be used, such as RAM, ROM, Flash memory, EEPROM, etc. Some memory 28 can be "volatile" (e.g. its memory state is lost when power is removed) while other memory 28 can be "nonvolatile" (e.g. its memory state is retained when power is removed). All forms of memory 28 are considered to be "non-transitory", as set forth in a memorandum entitled "Subject Matter Eligibility of Computer Readable Media" by David J. Kappos, Under Secretary of Commerce for Intellectual Property and Director of the United States Patent and Trademark Office dated Jan. 26, 2010, in that the memory 28 does not store data in a transitory propagating signal.

I/O circuitry 30 can be coupled to the digital processor 26 to interface the processor with a variety of different input components and output components for use with the client device 24. For example, a display 32 such as a display screen or other display device can output visual images, text, etc. produced by digital processor 26 and/or other components 38 of the client device 24. Touchscreen sensors 34 can be included on some types of device 24 to allow contact on or over the display screen 32 by a user or object to be sensed and the position of the contact relayed to digital processor 26. Audio devices 36 can be included, such as one or more speakers used to output sounds and music, and one or more microphones to receive voice input and other audio and relay the audio input to the digital processor 26.

Other various types of sensors 40 can be connected in device 24 and used to sense different characteristics, such as accelerometers and/or gyroscopes to sense motion of the client device 24 (e.g., tilting, rotation, or other movement in space), optical sensors to sense contact of the user on client device 24 or other objects in relation to the client device 24, magnetic sensors, or other types of sensors. Network I/O 42 can include one or more components for enabling communication of information between the client device 24 and other devices over a network. For example, wireless communication components can use radio frequency (RF), infrared (IR), or other wireless frequencies to communicate information in signals to and from wireless networks. Standard protocols such as cell phone protocols and/or WiFi can be used in some implementations. Other input and output components can also be included or connected to client device 24, such as components allowing various devices or networks to be connected via a wired connection to the client device 24, including Ethernet or other network components.

Figure 3:
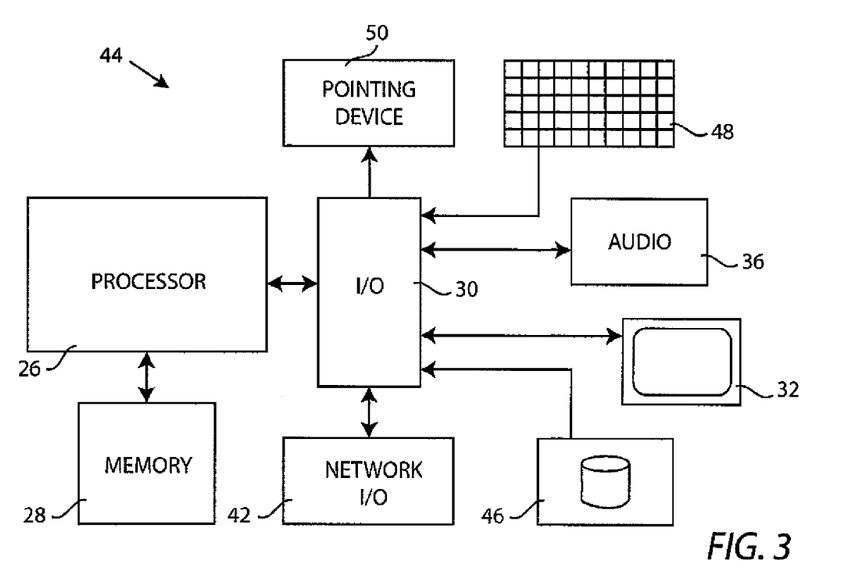
FIG. 3 is a block diagram illustrating an example client device, computer and/or server suitable for use with features described herein.

FIG. 3 is a block diagram illustrating an example computer system 44 suitable for use with features described herein. For example, some or all of the components of computer system 44 can be used as a server, such as ad server 18 and CDN server 20. Also, some or all of the components of computer system 44 can use used, for example, for client device 16. To the extent that components of client device 24 of FIG. 2 are analogous to components of computer system 44 of FIG. 3, like numerals will be used and the detailed descriptions of the components will not be repeated for the sake of brevity.

When used as a computer, such as client device 16, computer system 44 includes a digital processor 26, memory 28, I/O 30, display 32, audio 36 and network I/O 42 as described previously with respect to FIG. 2. In addition, certain embodiments include mass storage 46, a keyboard 48 and a pointing device 50. Mass storage 46 is often in the form of non-volatile read/write memory, such as a hard disk drive or flash memory, but also includes read-only memory, such as certain optical disc memories. The pointing device 50 can include a number of device types including a mouse, a trackball, a touch screen, a touch pad, etc. When used as a server, such as ad server 18 or content server 20, fewer of the components of example computer system 44 may be required.

Figure 4:
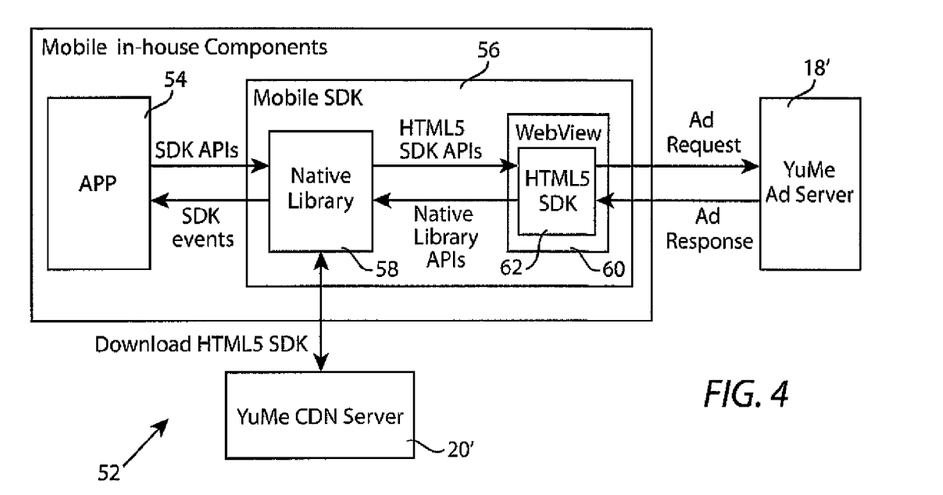
FIG. 4 is a block diagram illustrating example in-house components of a mobile client device, operating as a video player device, to interact with an ad server and a CDN server of FIG. 1.

FIG. 4 is a block diagram illustrating example "Mobile In-house Components" 52 of a mobile client device, operating as a video player device, to interact with a YuMe ad server 18' and YuMe CDN server 20' (see, for example, FIG. 1). The example Mobile In-house Components 52 can be stored in non-transitory memory 28 (a/k/a/ "computer readable media") of FIG. 2, by way of non-limiting example.

As used herein, "YuMe" is used as an arbitrary label to aid in the understanding of the various embodiments, and is not to be an implication that the product, process, article or composition with which it is associated must be derived from YuMe, Inc., a Delaware Corporation, or any other particular entity. Furthermore, use of YuMe herein as an adjective or adverb does not act as a limitation with respect to any element or step disclosed herein. YUME® is a registered trademark of YuMe, Inc. for advertising services in International Class 035.

The Mobile In-house Components 52 includes an application ("App") 52 and a Mobile SDK 56. The Mobile SDK 56 includes a Native Library 58, a web-view ("WebView") object 60, and an HTML5 (run-time) SDK 62 instantiated in the WebView object 60. It will be appreciated that the HTML5 SDK is only one example of an HTML protocol, and that later versions that are backwardly compatible with HTML5 can also be used for the run-time SDK 62. Also, WebView object 60 is provided by a number of vendors as a View class object that displays web pages. This class can support a web browser, or simply display some online content within an Activity. A WebView object generally does not provide browser-like widgets, does not enable JavaScript and web page errors are ignored.

The use of the run-time SDK achieves a number of important factors. For one, the Mobile SDK 56 can be upgraded "on the fly", e.g. at the time that the App 54 calls for a video advertisement. Furthermore, the Mobile SDK 56 can be used to monitor user and device data to optimize the performance of the mobile player device with respect to the selection, downloading and display of video ads. Also, the publisher does not have to install a Native SDK as part of the Mobile In-house Components 52 but, rather, just a Core Native Library which bootstraps the Mobile SDK 56 by downloading the run-time SDK from the YuMe CDN server 20'.

With continuing reference to FIG. 4, App 54 invokes SDK APIs of the Native Library 58 to start the request for an ad. The Native Library 58 then downloads an HTML5 ("runtime") SDK from YuMe CDN server 20' as part of the Native Library initialization. The Native Library 58 then loads the HTML5 SDK inside the WebView object 60 and invokes the Application Programming Interfaces (APIs) of the HTML5 SDK. Next, the HTML5 SDK makes an Ad Request of the YuMe Ad server 18', and receives back an Ad Response. The HTML5 SDK then plays the ad (provided as a part of the Ad Response) and reports appropriate events to Native Library 58 via Native Library APIs. The Native Library 58 then sends back SDK events to App 54.

In this example embodiment, an HTML5 SDK is employed. HTML5 is a core technology markup language of the internet used for structuring and presenting the World Wide Web (WWW). As of October, 2014, HTML5 represented the final and complete fifth revision of the HTML standard of the World Wide Web Consortium (W3C), and it replaced the previous version, HTML4, which was adopted as a standard in 1997. A main purpose of HTML5 is to improve the HTML language with support for the latest multimedia while keeping it easily readable by humans and consistently understood by computers and devices employing web browsers, parsers, etc. HTML5 is a response to the fact that the HTML and XHTML in common use on the World Wide Web are a mixture of features introduced by various specifications, along with those introduced by software products such as web browsers, those established by common practice, and the many syntax errors in existing web documents. It is also an attempt to define a single markup language that can be written in either HTML or XHTML syntax. Many features of HTML5 have been built with the consideration of being able to run on low-powered devices such as smartphones and tablets. The HTML5 standard (incorporated herein by reference) is well suited for the run-time SDK as disclosed herein, it being understood that future versions backwardly compatible with the HTML5 standard can also be employed.

Commercially, a native library will be delivered to publishers to integrate with their applications ("apps"). The interface between an application and a native library is clearly defined, and it is only a one-time task for a publisher to integrate the native library into their Mobile SDK. When the Publisher's App initializes the native library, the native library will, in-turn, download the run-time (a/k/a "Core") HTML5 SDK from a YuMe CDN server (if a new version is available), loads the Core HTML5 SDK in a WebView object and then initializes the Core HTML5 SDK. The native library also provides support for accessing device level information for use by the Core HTML5 SDK.

In an embodiment, when a new version of a Core HTML5 SDK is available for download, the native library will detect that there is an update by means of version comparison and then takes care of downloading and updating the Core HTML5 SDK with the latest version. The Core HTML5 SDK, in a non-limiting example, can contain business logic such as ad request, parsing, rendering and firing trackers. When an ad break occurs, the native library invokes an appropriate method in the Core HTML5 SDK to trigger an ad request call. Upon a successful ad response from the YuMe ad server, the Core HTML5 SDK takes care of rendering the ad and passes back control to the native SDK once the ad is complete.

Figure 5:
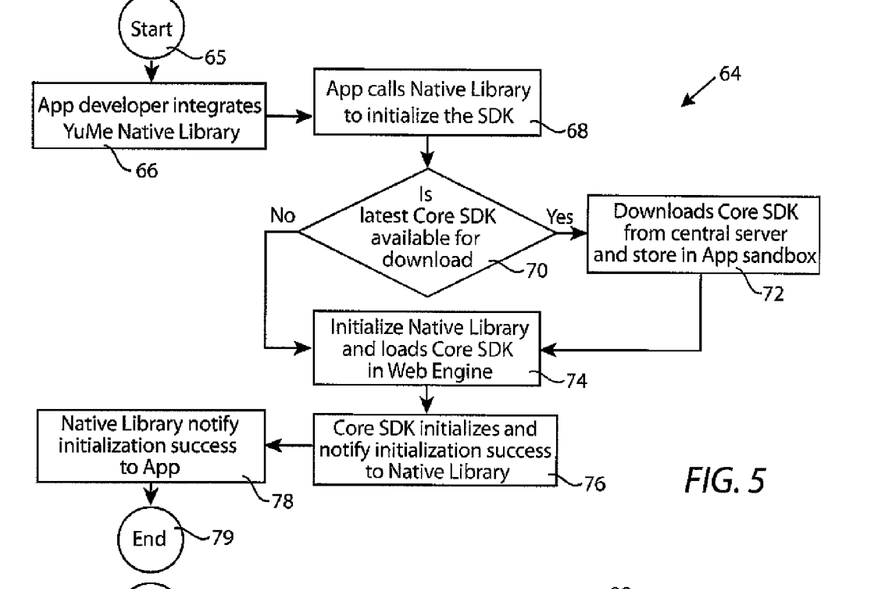
FIG. 5 is a flow diagram, set forth way of example and not limitation, of a process to initialize a run-time ("core") SDK.

FIG. 5 is a flow diagram, set forth way of example and not limitation, of a process 64 to initialize a run-time ("Core") SDK. The process begins at 65 and, in an operation 66, and App developer integrates a YuMe Native Library. Next, in an operation 68, the App calls the Native Library to initialize the Mobile SDK. A decision operation 70 determines whether the latest Core SDK is available and, if so, downloads the Core SDK from the CDN server an stores it in the App's "sandbox" in an operation 72. If the latest Core SDK isn't available for download, or after operation 72, the Native Library is initialized and the Core SDK is loaded into the WebView object (a/k/a "Web Engine"). Next, and operation 76 initializes the Core SDK and then notifies the Native Library of the successful completion of the initialization. The Native Library notifies initialization success to the App in an operation 78, and the process 65 is complete at 79.

Figure 6:
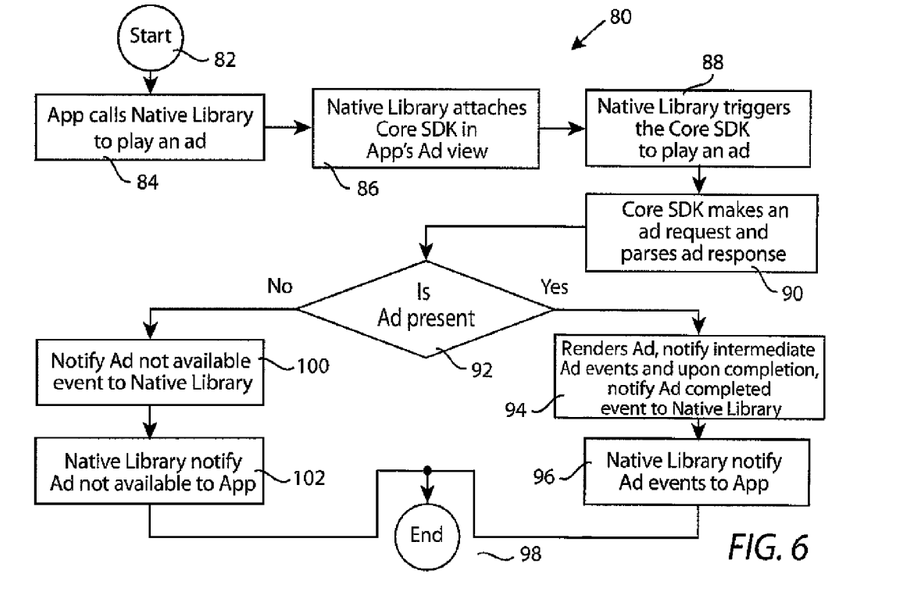
FIG. 6 is a flow diagram, set forth way of example and not limitation, of a process to handle ad opportunities and breaks.

FIG. 6 is a flow diagram, set forth way of example and not limitation, of a process 80 to handle ad opportunities and breaks. Process 80 begins at 82 and, in an operation 84, the App calls the Native Library to play an ad. Next, in an operation 86, the Native Library attaches a run-time ("Core") SDK in the App's WebView (a/k/a "Ad View"). An operation 88 has the Native Library trigger the Core SDK to play an ad, and the Core SDK makes an ad request and parses the ad response in an operation 90. A decision operation 92 determines if an Ad is present and, if so, an operation 94 renders the Ad, notifies of intermediate Ad events and, upon completion, notifies the Native Library with an "Ad completed" event. The Native Library then notifies the App with Ad events, and the process 80 is completed at 98. If, however, operation 92 determines that there is not Ad present, an operation 100 notifies the Native Library of an "Ad not available" event, and the Native Library notifies the App that the Ad is not available in an operation 102 before the process is completed at 98.

Figure 7:
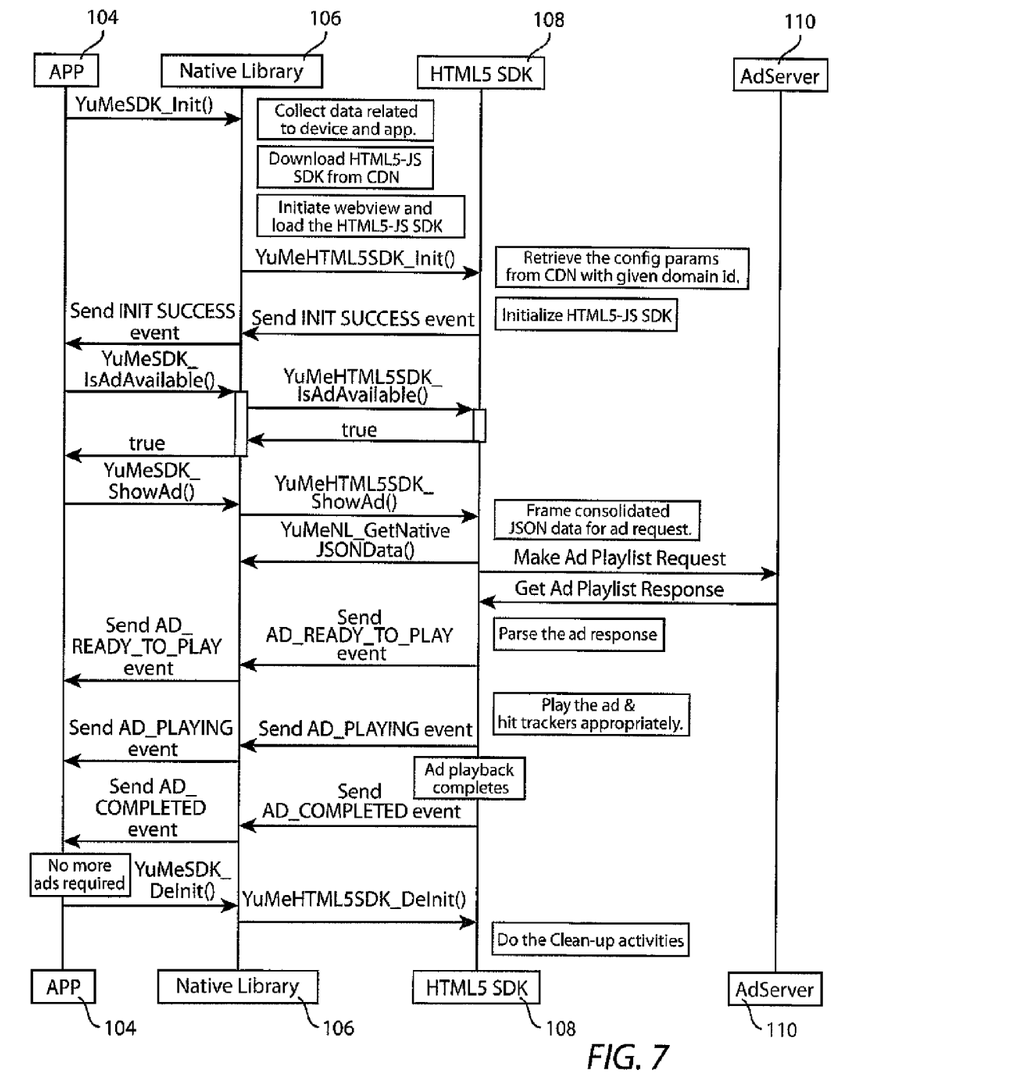
FIG. 7 is an event flow diagram, set forth by way of example and not limitation, for handling a streaming video ad with a filled response.

FIG. 7 is an event flow diagram, set forth by way of example and not limitation, for handling a streaming video ad, to illustrate the processes and actions of an App 104, a Native Library 106, an HTML5 SDK 108, and an Ad Server 110. First, the App 104 initializes the Native Library 106 with a YuMeSDK_Init( ) command, which is passed on the HTML5 SDK 108 by the Native Library as a YuMeHTML5SDK_Init( ) command. A successful initiation of the HTML5 SDK is then relayed to the App 104 by the Native Library 106. The App 104 then queries the Native Library 106 about the availability of an ad which, in turn, queries the HTML5 SDK 108. If an ad is available, the App 104 requests the Native Library 106 to show the ad, which is relayed to the HTML5 SDK 108 which ask for, and receives, an Ad Playlist Response from the Ad Server. The HTML5 SDK then informs the App 104 via the Native Library 106 that the Ad is ready to play, that it is playing, and that the ad is completed. The App 104 than de-initializes the Native Library with a YuMeSDK_DeInit( ) command, which de-initializes the HTML5 SDK with a YuMeHTML5SDK_DeInit( ) command.

Figure 8:
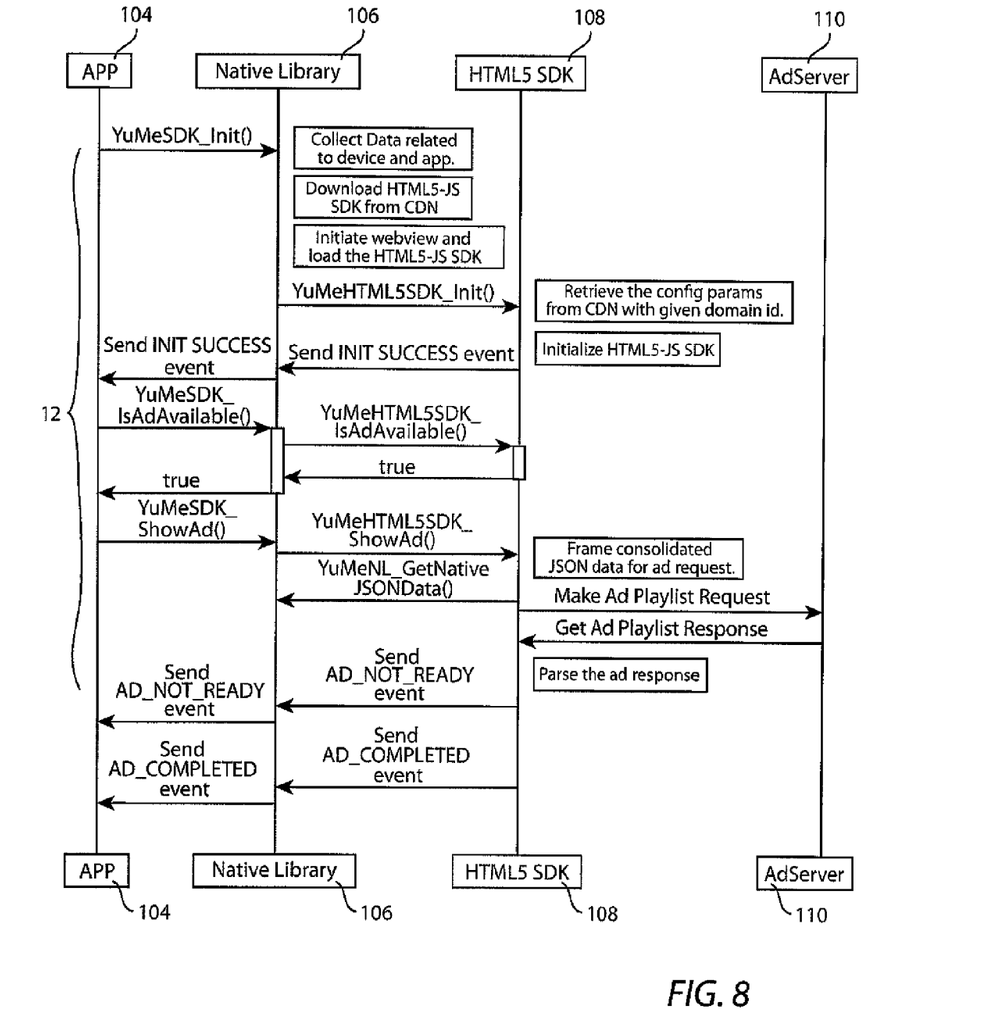
FIG. 8 is an event flow diagram, set forth by way of example and not limitation, for handling a streaming video ad with an empty response.

FIG. 8 is an event flow diagram, set forth by way of example and not limitation, for handling a streaming video ad with an empty response, to again illustrate the processes and actions of App 104, Native Library 106, HTML5 SDK 108, and AdServer 110. It should be noted that the portion of the event flow diagram of FIG. 8 bracketed at 112 is the same as the event flow diagram of FIG. 7. Where the event flow diagrams diverge is after the HTML5 SDK 108 parses the Ad Playlist Response it is determined that an Ad is not available. In such a case, the Native Library 106 relays an "Ad not Ready" event and then an "Ad Completed" event from the HTML5 SDK 108 to the App 104.

Figure 9:
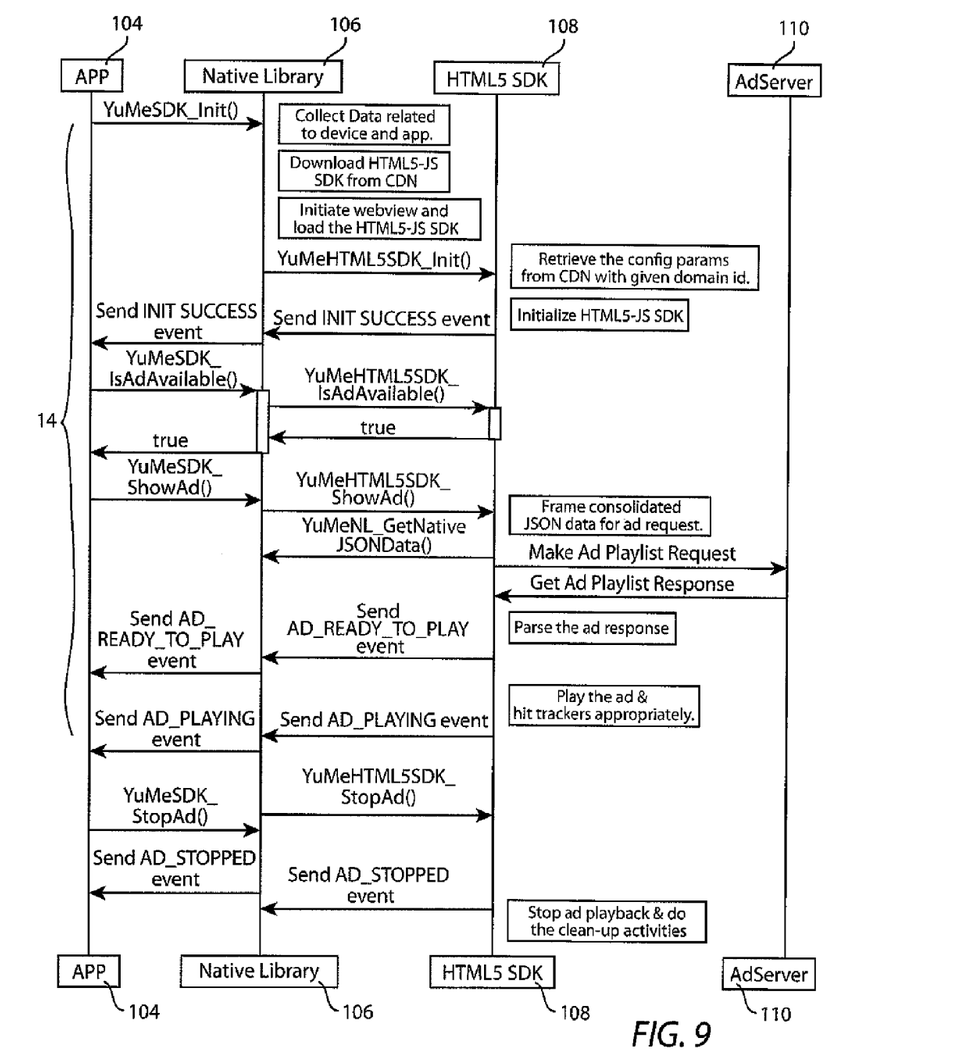
FIG. 9 is an event flow diagram, set forth by way of example and not limitation, for handling a streaming video ad with a filled response that is stopped before completion.

FIG. 9 is an event flow diagram, set forth by way of example and not limitation, for handling a streaming video ad with a filled response that is stopped before completion, to again illustrate the processes and actions of App 104, Native Library 106, HTML5 SDK 108, and AdServer 110. It should be noted that the portion of the event flow diagram of FIG. 9 bracketed at 114 is the same as the event flow diagram of FIG. 7. Where the event flow diagrams diverge is after App 104 sends a YuMeSDK_StopAd( ) command to Native Library 106, which relays the message to HTML5 SDK 108. Native Library 106 then relays an "Ad Stopped" event from the HTML5 SDK 108 to the App 104.

Figure 10:
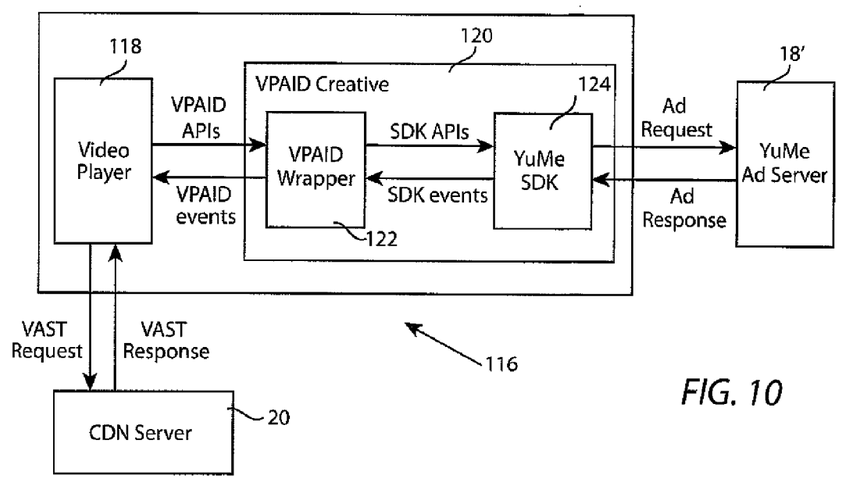
FIG. 10 is a block diagram illustrating example in-house components of a client computer device, operating as a video player device, to interact with an ad server and a CDN server of FIG. 1.

FIG. 10 is a block diagram illustrating example "in-house" components 116 of a client computer device, operating as a video player, to interact with a YuMe ad server 18' and a CDN server 20 (see, for example, FIG. 1). The example in-house components 116 can be stored in non-transitory memory 28 (a/k/a/ "computer readable media") of FIG. 3, by way of non-limiting example.

Again, as used herein, "YuMe" is an arbitrary label to aid in the understanding of the various embodiments, and is not to be an implication that the product, process, article or composition with which it is associated must be derived from YuMe, Inc., a Delaware Corporation, or any other particular entity. Furthermore, use of YuMe herein as an adjective or adverb does not act as a limitation with respect to any element or step disclosed herein. YUME® is a registered trademark of YuMe, Inc. for advertising services in International Class 035.

The in-house components 116 include a Video Player 118 and a VPAID Creative 120. The VPAID Creative includes a VPAID Wrapper and a run-time YuMe SDK 124. The Video Player 118 communicates with CDN Server 20 over a network, and the YuMe SDK 124 communicates with the YuMe Ad Server 18' over the network (e.g. the internet or a telephone network).

In this example embodiment, set forth by way of example and not limitation, the YuMe SDK is configured as a VPAID creative, and operates and tracks in the same manner as a native YuMe SDK. Since the YuMe SDK is disguised as a VPAID creative, any VPAID-compliant video player will load and interact with VPAID creative to implement YuMe SDK functionality.

It should be noted that the run-time YuMe SDK implemented as a VPAID creative is a surprising and unexpected use of a VPAID creative. The intended purpose of layering VPAID onto VAST is to offer multi-platform compatibility with enhanced video ad display. That is, VPAID establishes a common communication protocol between video players and ad units that allows a single "executable ad" ("VPAID creative"), which requires software logic to be executed as part of ad playback, to be displayed in-stream with the publisher's video content in any compliant video player. Furthermore, it enables the executable ad unit to expect and rely upon a common set of functionalities from the video player.

With the adoption of VPAID, advertisers have more control over the display experience in their video campaigns. The video player makes the ad call (instead of the browser) and interprets the ad response from the ad server. The video player is also the run-time environment for the in-stream video ad unit and controls its lifecycle. The VPAID API allows advertisers to distribute these executable ads across a broad set of compliant video players and publishers, to many compliant publishers.

By providing its run-time SDK as a VPAID creative, the "executable ad" is used for an unintended purpose. The run-time SDK is not, in fact, an ad at all. However, it has been unexpectedly discovered that the intended purpose of a VPAID creative can be hijacked for the purpose of providing a run-time SDK for a video player.

An example operation of the in-house components 116, the YuMe Ad Server 18', and the CDN Server 20 of FIG. 10 is as follows. In an embodiment, set forth by way of example and not limitation, Video Player 118 makes a VAST request to CDN Server 20, which provides a VAST response that contains a run-time YuMe SDK as a VPAID creative. Video Player 118 then parses the VAST response, loads the VPAID creative and invokes the VPAID APIs. The YuMe SDK 124 makes the Ad Request to YuMe Ad server 18', which responds back with an Ad Response, after which YuMe SDK 124 plays the Ad and reports appropriate SDK events to VPAID Wrapper 112 which, in turn, reports VPAID events to the Video Player.

Figure 11:
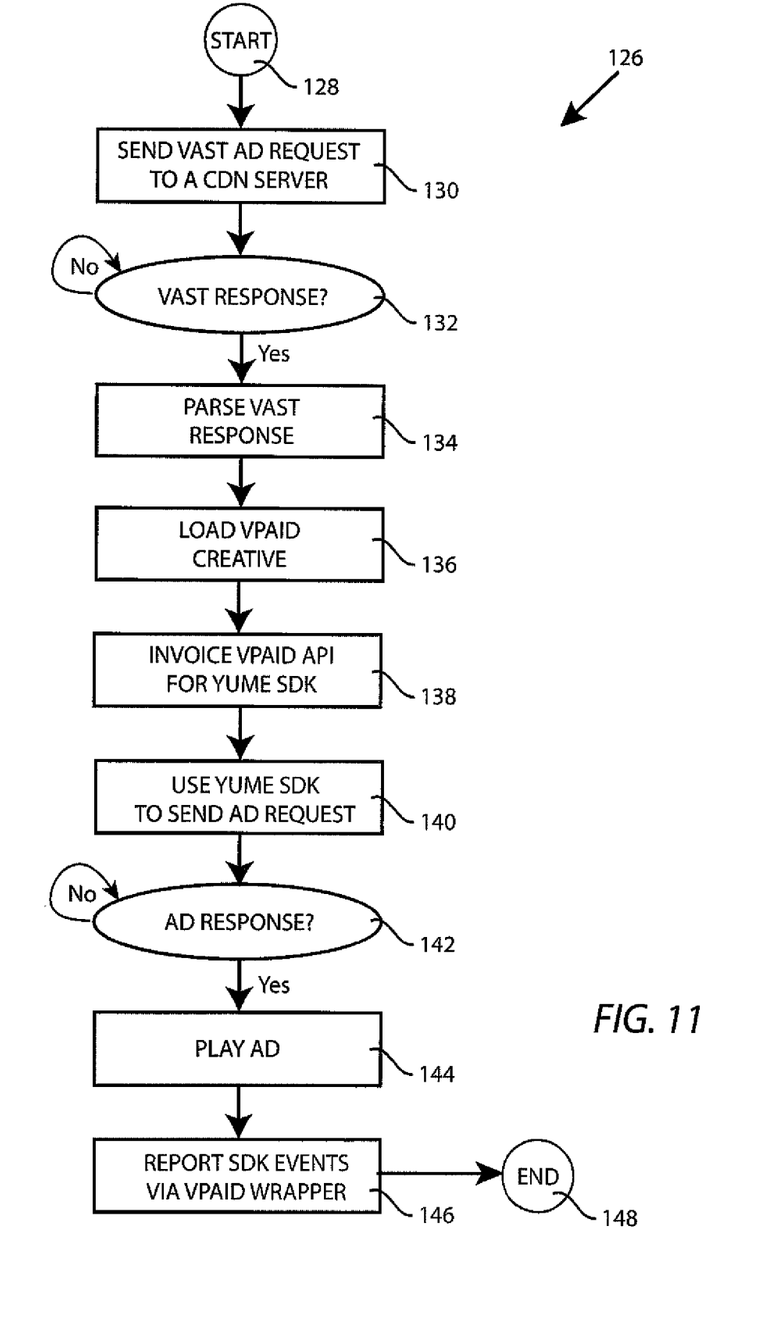
FIG. 11 is a flow diagram, set forth by way of example and not limitation, of a video player process including automatic SDK integration.

FIG. 11 is a flow diagram, set forth by way of example and not limitation, of a video player process 126 including automatic SDK integration. Process 126 begins at 128 and, in an operation 130, a VAST Ad Request is sent to a CDN Server. Next, a decision operation 132 determines if a VAST Response has been received. If yes, the VAST Response is parses in an operation 134. Next, in an operation 136, the VPAID Creative is loaded and, in an operation 138, there is an invocation of the VPAID API for the YuMe SDK. Next, the YuMe SDK is used to send an ad request, and a decision operation 142 determines if there is an ad response. If so, an operation 144 plays the Ad. Finally, an operation 146 reports SDK events via the VPAID Wrapper and the process 126 terminates at 148.

It should be noted that a publisher need not instantiate a YuMe SDK into its video player at the time that the player is provided to a user. Rather, when the video player makes a VAST Request to the CDN server, a run-time SDK is packages as a VAST Response with a VPAID Creative, which is sent back to the video player in order to instantiate the run-time SDK. The process and apparatus of this example embodiment, therefore, frees publishers from the need to instantiate an advertiser's SDK into its video players and furthermore provides an up-to-date "run-time" version of the SDK to the video player.

Figure 12:
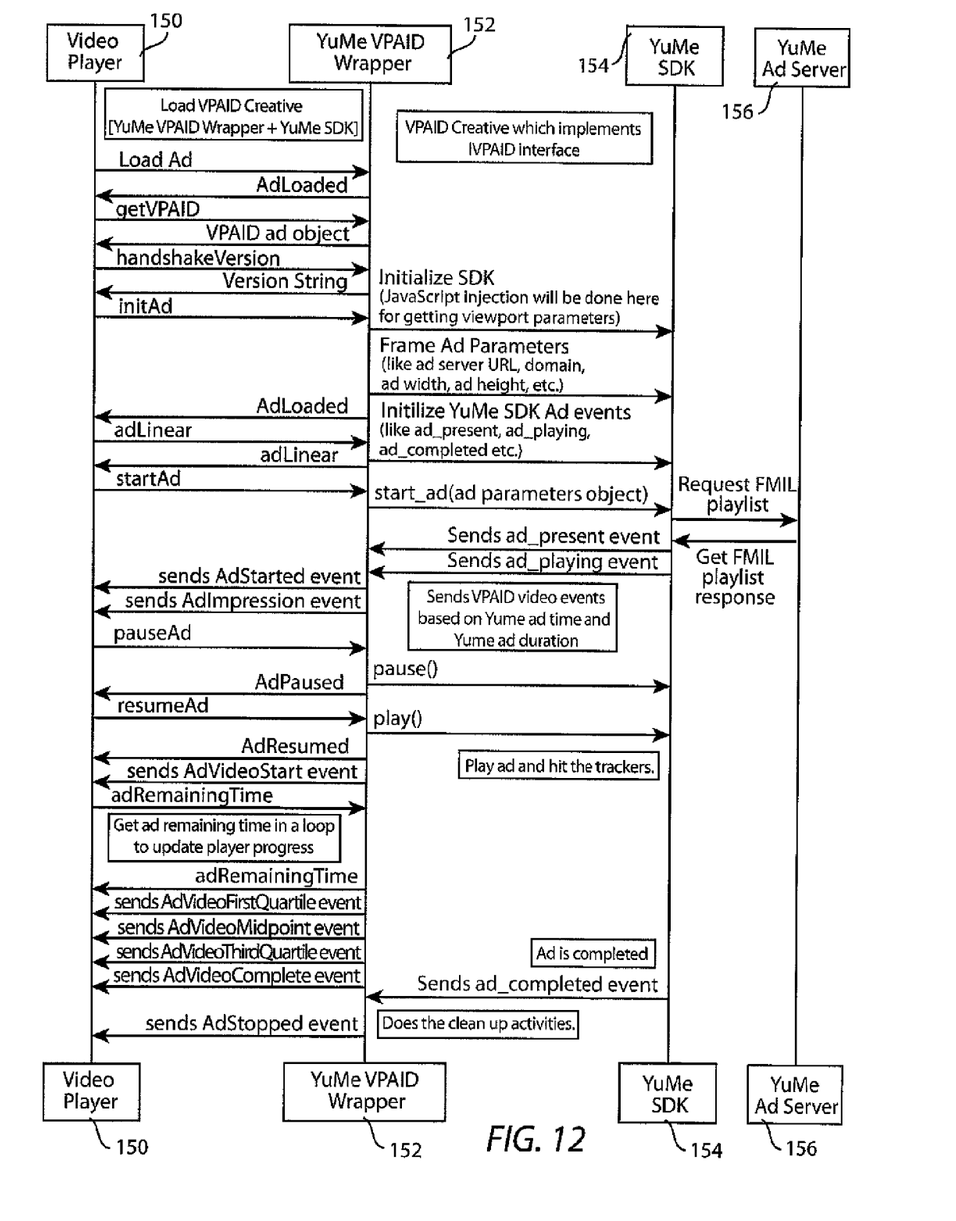
FIG. 12 is an event flow diagram, set forth by way of example and not limitation, for integrating a run-time SDK, configured as a VPAID creative, into a video player device.

FIG. 12 is an event flow diagram, set forth by way of example and not limitation, for integrating a run-time SDK, configured as a VPAID creative, into a video player device to illustrate the processes and actions of a Video Player 150, a YuMe VPAID Wrapper 152, a YuMe SDK 154, and a YuMe Ad Server 156. As noted, the process begins with the Video Player loading a VPAID Creative (including a YuMe VPAID Wrapper and a YuMe SDK) as an "ad." The Video Player 150 then instructs the YuMe VPAID Wrapper 152 to initialize, which causes the YuMe VPAID Wrapper 152 to initialize the YuMe SDK 154. Next, the YuMe SDK requests the FMIL playlist and receives the response from the YuMe Ad Server 156. In this non-limiting example, the FMIL playlist is a proprietary playlist of YuMe, Inc. From that point, the YuMe SDK 154 controls the advances play of the Ad(s), reports events, and otherwise optimizes the performance of the video player device.

Figure 13:
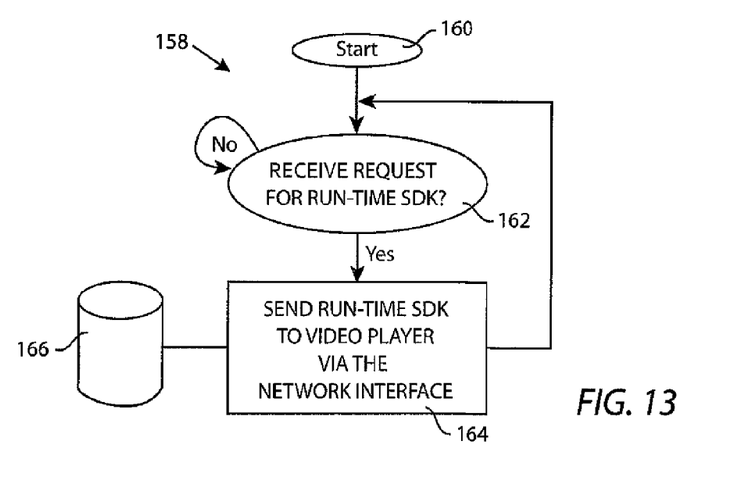
FIG. 13 is a flow diagram, set forth by way of example and not limitation, of a process running on a CDN server of FIG. 1.

FIG. 13 is a flow diagram, set forth by way of example and not limitation, of a process 158 running on a CDN server 20 of FIG. 1. Process 158 begins at 160 and, in a decision operation 162, it is determined whether it has received a request for a run-time SDK. If yes, a run-time SDK is sent to the requesting video player via a network interface.

In certain example embodiments, the latest version of a run-time SDK is downloaded from the CDN server and integrated with a video player to improve the performance of the video player device. In other example embodiments, a run-time SDK is disguised as a VPAID creative, and is automatically integrated into a video player device that is VAST/VPAID compliant.

Although various embodiments have been described using specific terms and devices, such description is for illustrative purposes only. The words used are words of description rather than of limitation. It is to be understood that changes and variations may be made by those of ordinary skill in the art without departing from the spirit or the scope of any embodiments described herein. In addition, it should be understood that aspects of various other embodiments may be interchanged either in whole or in part. It is therefore intended that the claims herein and hereafter presented be interpreted in accordance with their true spirit and scope and without limitation or estoppel.

What is claimed is:

1. A video player device with run-time SDK integration comprising:
    a digital processor;
    a screen coupled to the digital processor;
    a network interface coupled to the digital processor;
    non-transitory digital memory coupled to the digital processor including code segments that are executable on the digital processor for:
    obtaining a run-time Software Development Kit (SDK) from a Content Delivery Network (CDN) server via the network interface when it is time to display a video advertisement (Ad) on the screen;
    making an Ad request to an Ad server via the network interface using the run-time SDK; and
    providing video player operative to display an Ad on the screen that is received as an Ad response from the Ad server, wherein the video player makes a Video Ad Serving Template (VAST) request to the CDN server and receives a VAST response including a Video Player-Ad Interface Definition (VPAID) wrapper containing a run-time SDK as a VPAID creative, and wherein the video player parses the VAST response, loads the VPAID creative, and invokes VPAID APIs of the run-time SDK.

2. A video player device with run-time SDK integration as recited in claim 1 wherein the non-transitory digital memory further includes code segments that are executable on the digital processor to implement a mobile platform application (App).

3. A video player device with run-time SDK integration as recited in claim 2 wherein the non-transitory digital memory further includes code segments comprising a mobile SDK Native Library, wherein an initialization of the Native Library initiates a download of a Hypertext Markup Language (HTML) SDK from the CDN server, and wherein the run-time SDK is at least HTML Version 5 (HTML5).

4. A video player device with run-time SDK integration as recited in claim 3 wherein the non-transitory digital memory further includes code segments comprising a web-view object, and wherein the run-time SDK is loaded into the web-view object.

5. A video player device with run-time SDK integration as recited in claim 4 wherein the Native Library invokes Application Programming Interfaces (APIs) of the run-time SDK to make the Ad request.

6. A video player device with run-time SDK integration as recited in claim 5 wherein the runtime SDK plays the Ad on the screen and reports events to the Native Library using Native Library APIs.

7. A video player device with run-time SDK integration as recited in claim 6 wherein the Native Library sends SDK events to the App.

8. A video player device with run-time SDK integration as recited in claim 1 wherein the run-time SDK makes the Ad request to, and receives an Ad response from, the Ad server.

9. A video player device as recited in claim 8 wherein the run-time SDK displays the Ad and reports events to the VPAID wrapper, which then sends VPAID events to the video player.

10. A method for improving video ad display on a video player device comprising:
    providing a video player device including a digital processor, a screen coupled to the digital processor, a network interface coupled to the digital processor, and non-transitory digital memory coupled to the digital processor including code segments implementing a video player;
    obtaining a run-time Software Development Kit (SDK) from a Content Delivery Network (CDN) server via the network interface when it is time to display a video advertisement (Ad) on the screen;
    making an Ad request to an Ad server via the network interface using the run-time SDK; and
    displaying the Ad using the video player;
    wherein the video player device makes a Video Ad Serving Template (VAST) request to the CDN server and receives a VAST response including a Video Player-Ad Interface Definition (VPAID) wrapper containing a run-time SDK as a VPAID creative, and wherein the video player parses the VAST response, loads the VPAID creative, and invokes VPAID APIs of the run-time SDK.

11. A method for improving video ad display on a video player device as recited in claim 10 wherein the run-time SDK is a Hypertext Markup Language (HTML) SDK of at least Version 5 (HTML5), and wherein the video player further comprises a mobile platform application (App) and a mobile SDK Native Library.

12. A method for improving video ad display on a video player device as recited in claim 11 wherein the SDK Native Library loads the run-time SDK from the CDN server via the network interface.

13. A method for improving video ad display on a video player device as recited in claim 12 wherein the run-time SDK plays the Ad and reports events to the Native Library using Native Library Application Programming Interfaces (APIs), and wherein the Native Library sends SDK events to the App.

14. A method for improving video ad display on a video player device as recited in claim 10 wherein the run-time SDK makes the Ad request, receives an Ad response from the Ad server, plays the Ad and reports events to the VPAID wrapper, and the VPAID wrapper sends VPAID events to the video player.

15. A Content Delivery Network (CDN) server comprising:
- a digital processor;
- a network interface coupled to the digital processor;
- non-transitory digital memory coupled to the digital processor including code segments that are executable on the digital processor for:
- receiving a request via the network interface from a video player device for a run-time Software Development Kit (SDK), wherein the request for a run-time SDK comprises a Video Ad Serving Template (VAST) request and the run-time SDK comprises a VAST response including a VPAID wrapper containing a run-time SDK as a VPAID creative; and
- sending the run-time SDK to the video player via the network interface;
- whereby the run-time SDK is configured for automatic integration with the video player device.

16. A Content Delivery Network (CDN) server as recited in claim 15 wherein the video player device is a mobile platform, and wherein the run-time SDK is an Hypertext Markup Language (HTML) SDK of at least Version 5 (HTML5).

17. A Content Delivery Network (CDN) server as recited in claim 16 wherein the run-time SDK is configured to be loaded into a web-view object of the video player and to interface with a Native Library of the video player using HTML SDK Application Programming Interfaces (APIs).

\* \* \* \* \*